(12) United States Patent
Yang et al.

(10) Patent No.: US 7,186,031 B2
(45) Date of Patent: Mar. 6, 2007

(54) OPTICAL INTERCONNECT DEVICE

(75) Inventors: Lizhang Yang, Austin, TX (US); Sergio D. Carranza, Cedar Park, TX (US); Michael A. Jessup, Dripping Springs, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/687,329

(22) Filed: Oct. 16, 2003

(65) Prior Publication Data

US 2005/0084216 A1   Apr. 21, 2005

(51) Int. Cl.
G02B 6/36 (2006.01)
(52) U.S. Cl. .......................................... 385/53; 385/77
(58) Field of Classification Search ................. 385/53, 385/71, 77, 78, 83
See application file for complete search history.

(56) References Cited

U.S. PATENT DOCUMENTS

| | | | |
|---|---|---|---|
| 4,715,700 A * | 12/1987 | Daniel | 385/31 |
| 5,006,201 A | 4/1991 | Kaukeinen | |
| 5,367,595 A | 11/1994 | Jennings et al. | |
| 5,838,860 A * | 11/1998 | Kingstone et al. | 385/100 |
| 5,862,281 A * | 1/1999 | Shahid | 385/78 |
| 5,903,693 A | 5/1999 | Brown | |
| 5,905,829 A * | 5/1999 | Maenishi et al. | 385/59 |
| 5,915,055 A | 6/1999 | Bennett et al. | |
| 5,923,803 A * | 7/1999 | Bunin et al. | 385/80 |
| 5,966,489 A | 10/1999 | Harwell et al. | |
| 5,970,195 A | 10/1999 | Brown | |
| 6,059,224 A | 5/2000 | Eoll | |
| 6,072,932 A | 6/2000 | Bennett et al. | |
| 6,231,244 B1 * | 5/2001 | Fukuyama et al. | 385/76 |
| 6,321,019 B1 | 11/2001 | Shibuya et al. | |

(Continued)

FOREIGN PATENT DOCUMENTS

EP    0 978 744 A2    2/2000

(Continued)

OTHER PUBLICATIONS

U.S. Application entitled "Apparatus and Method for Transitioning Fiber Optic Cables", Filed Oct. 16, 2003, having U.S. Appl. No. 10/687,195.

(Continued)

*Primary Examiner*—Thanh-Tam Le
(74) *Attorney, Agent, or Firm*—Gregg H. Rosenblatt; Melanie G. Gover (57) ABSTRACT

Disclosed herein is an optical interconnect device comprising (a) a plurality of fiber optic cables, each cable having two ends and comprising at least one optical fiber surrounded by a protective jacket where the diameter of the fiber optic cable is larger than the diameter of the optical fiber and where the protective jacket at least a first end of the fiber optic cable has been removed thereby exposing the optical fibers; (b) a ribbonized assembly encasing a portion of the first end of the fiber optic cable and the optical fibers, where the optical fibers in the ribbonized assembly lie parallel to one another and has a first pitch; and (c) a ferrule attached to the ribbonized assembly, the ferrule having a plurality of internal grooves having a second pitch. The first pitch of the optical fibers is substantially equal to the second pitch of the ferrule.

15 Claims, 5 Drawing Sheets

U.S. PATENT DOCUMENTS

| | | | |
|---|---|---|---|
| 6,340,247 B1 * | 1/2002 | Sakurai et al. | 385/78 |
| 6,389,214 B1 | 5/2002 | Smith et al. | |
| 6,409,394 B1 * | 6/2002 | Ueda et al. | 385/80 |
| 6,419,399 B1 | 7/2002 | Loder et al. | |
| 6,421,493 B1 | 7/2002 | Burek et al. | |
| 6,438,299 B1 | 8/2002 | Brown et al. | |
| 6,560,395 B1 | 5/2003 | Shahid | |
| 6,623,175 B2 * | 9/2003 | Suematsu et al. | 385/78 |
| 6,634,800 B2 * | 10/2003 | Suematsu et al. | 385/80 |
| 6,690,867 B2 * | 2/2004 | Melton et al. | 385/114 |
| 6,814,504 B2 * | 11/2004 | Nakanishi et al. | 385/92 |
| 6,931,195 B2 * | 8/2005 | Lemoff | 385/137 |

FOREIGN PATENT DOCUMENTS

| | | |
|---|---|---|
| EP | 1 139 127 A2 | 10/2001 |
| EP | 1 195 634 A2 | 4/2002 |
| EP | 1 215 517 A2 | 6/2002 |
| EP | 1 338 908 A2 | 8/2003 |
| JP | 54 037766 A | 3/1979 |
| JP | 02093406 | 4/1990 |
| JP | 06 063483 A | 3/1994 |
| JP | 0 782 022 A1 | 7/1997 |
| JP | 2000180639 | 6/2000 |
| JP | 2002 341209 A | 11/2002 |

OTHER PUBLICATIONS

Search Report for PCT/US2004/031131.

* cited by examiner

OPTICAL INTERCONNECT DEVICE

CROSS REFERENCE TO RELATED APPLICATION

The present application is related to Assignee's copending patent application having an attorney docket number 58829US002 entitled "Apparatus and Method for Transitioning Fiber Optic Cables", filed even date herewith.

FIELD OF INVENTION

The present invention relates to an optical interconnect device having a transition zone that is functions to transition and to ribbonize a plurality of larger diameter fiber optic cables to a plurality of smaller diameter optical fibers.

BACKGROUND

It is a common practice in optical or opto-electronic systems to include various devices to manage the number of fiber optic cables used. Such devices can require the splitting, sometimes referred to as "furcating", of the optical fibers in a multi-fiber ribbon or multi-fiber ribbon cable or the joining, commonly referred to as the "ribbonizing" of the optical fibers. In such cases, a furcation device or a ribbonizing device can be used.

While furcation and ribbonizing devices described in the art may be useful in various applications, there is a continuing need to develop other devices that can easily be manufactured.

SUMMARY

Disclosed herein are an apparatus and a process for transitioning and ribbonizing fiber optic cables to produce ribbonized assembly where the fiber optic cable to the optical fiber transition section is designed having a geometry so as not to violate the minimum bend radius of the fiber optic cable used. The transition section captures the change from a large diameter fiber optic cable to a smaller diameter optical fiber. The ribbonized assembly can further be terminated to a ferrule to be part of a parallel ribbon optical fiber connector (such as, e.g. MTP connector, commercially available from US Conec, Hickory, N.C. and OGI connectors, commercially available from 3M Company, St. Paul, Minn.). Thus, also disclosed herein is an optical interconnect device containing the ribbonized assembly.

In one aspect, the present invention relates to an apparatus for ribbonizing fiber optic cables. The apparatus comprises at least one channel, each channel comprising: (a) an input zone for holding a plurality of fiber optic cables, each cable having at least one optical fiber; (b) a transition zone adjacent to the input zone; and (c) an output zone adjacent to the transition zone, the output zone comprising at least one slot, each slot having a width that is equal to a multiple of the diameter of the optical fiber. In one exemplary embodiment, the transition zone has a geometry that will not violate the minimum bend radius of the fiber optic cable.

In another aspect, the present invention relates to a method of making a ribbonized assembly. The method comprises the following steps: (a) providing a plurality of fiber optic cables, each cable having at least one optical fiber surrounded by a protective jacket; then (b) stripping the protective jacket around at least one end of the fiber optic cable to expose the optical fibers; (c) disposing the optical fibers in the channels of the apparatus of the present invention such that the fiber optic cable lies in the input zone and the exposed optical fibers lies in the output zone; then (d) applying an ultraviolet light curable resin to the transition zone; and (e) curing the ultraviolet light curable resin.

In yet another aspect, the present invention relates to an optical interconnect device comprising: (a) a plurality of fiber optic cables, each cable having two ends and comprising at least one optical fiber surrounded by a protective jacket where the diameter of the fiber optic cable is larger than the diameter of the optical fiber and where the protective jacket at least a first end of the fiber optic cable has been removed thereby exposing the optical fibers; (b) a ribbonized assembly encasing a portion of the first end of the fiber optic cable and the optical fibers, where the optical fibers in the ribbonized assembly lie parallel to one another and has a first pitch; and (c) a ferrule attached to the ribbonized assembly, the ferrule having a plurality of internal grooves having a second pitch. The first pitch of the optical fibers is substantially equal to the second pitch of the ferrule. In one exemplary embodiment, the transition zone has geometry so as not to violate the minimum bend radius of the fiber optic cable.

Figure 9:
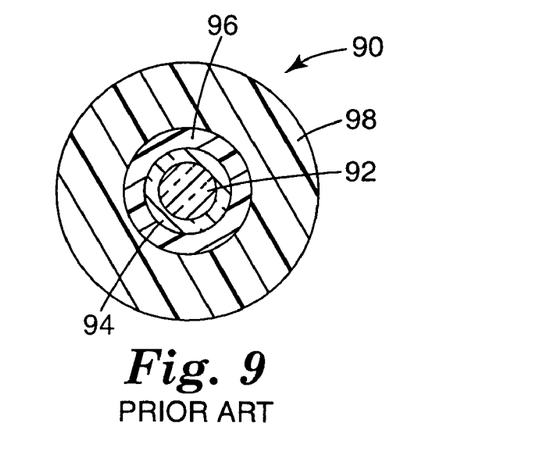
FIG. 9 is a cross-sectional view of an exemplary fiber optic cable that can be used in the present invention.

As used herein, a "fiber optic cable" (as shown in FIG. 9) comprises at least one glass core 92, each core surrounded by cladding 94. Buffer 96 surrounds the core/cladding combination and protective jacket 98 surrounds the buffer. A fiber optic cable can contain more than one glass core and cladding combination. Information and data, packaged in the form of light waves, travels the length of the glass core. The term "optical fiber" defines the combination of the glass core, cladding, and buffer and is meant to be an active fiber, i.e., information is transmitted in the optical fiber. A "non-active" fiber is one where no information is being transmitted. When used, the diameter of the non-active fiber is substantially similar to that of the optical fiber and can but does not have to be of the same material as the optical fiber. The "minimum bend radius" (MBR) of the fiber optic cable and its associated optical fiber is a value recommended by the fiber optic cable manufacturer or a value specified by a customer to achieve a desired cable lifetime and a desired optical fiber lifetime. When the fiber optic cable and its optical fiber experience a bend that is of a smaller radius than the MBR, i.e., when the MBR has been violated, the attenuation in the optical fiber increases and the life of the optical fiber decreases. For an optical fiber with 125 micrometer glass diameter, the generally accepted MBR is about one inch (2.54 cm).

An advantage of one exemplary embodiment of the present invention is that it provides an efficient method for transitioning and ribbonizing a plurality of large diameter fiber optic cables to a plurality of smaller diameter optical fibers. Another advantage of the invention is that the transition is designed so as to minimize the possibility that the MBR of the fiber optic cable and its optical fibers will be violated. As further explained herein, the geometry of the transition zone can be designed so as to accommodate this particular requirement.

An advantage of another exemplary embodiment of the present invention is that because the optical fibers are encased in the ultraviolet light cured resin, they are protected during subsequent processing, allowing for easy handling. Furthermore, the output end of the apparatus is designed so as to force the optical fibers, disposed parallel to one another, into a particular pitch, a pitch that would coincide with the pitch of the ferrule used. As used herein, the term "pitch" means the centerline distance between two adjacent objects, such as two adjacent optical fibers, whether they are active or non-active, or two adjacent internal grooves of a fiber optic ferrule.

The above summary of the present invention is not intended to describe each disclosed embodiment or every implementation of the present invention. The Figures and the detailed description, which follow more particularly exemplify illustrative embodiments.

BRIEF DESCRIPTION OF THE DRAWINGS

The present invention can be described with reference to the following figures, wherein.

These figures are idealized, not drawn to scale and are intended for illustrative purposes.

DETAILED DESCRIPTION

Figure 1:
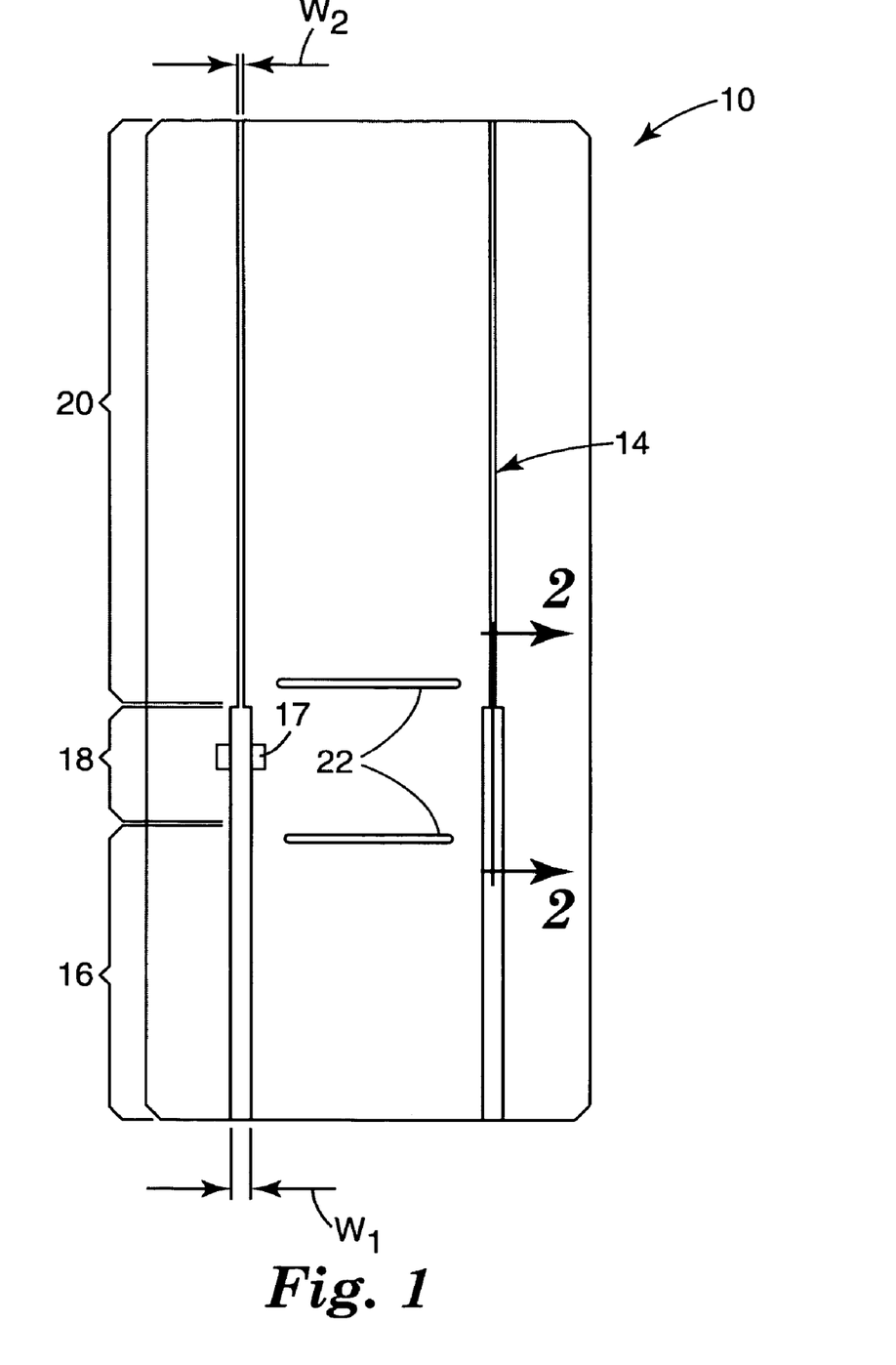
FIG. 1 is a top view of an exemplary apparatus for ribbonizing large diameter fiber optic cables to smaller diameter optical fibers.

FIG. 1 shows an exemplary apparatus useful for transitioning and ribbonizing a plurality of large diameter fiber optic cables to a plurality of smaller diameter optical fibers. Apparatus 10 has at least one channel 14. Each channel has input zone 16 for holding a plurality of fiber optic cables. Each channel also has transition zone 18 adjacent to the input zone and output zone 20 adjacent to the transition zone. The output zone has at least one slot.

Although FIG. 1 shows brackets defining each zone, the figure should not be construed to mean that there is a sharp distinction for each zone. On the contrary, and as better explained in FIG. 3 among other figures, the input zone generally contains the fiber optic cables. The transition zone generally contains a portion of the stripped fiber optic cable and the exposed optical fibers. And, the output zone contains the optical fibers lying parallel to one another touching or nearly touching each other. Optionally, the apparatus can include indicating means 22 bracketing the area near the transition zone. As shown in this figure, there are two channels and the left hand most channel further contains region 17 in the transition zone for fabricating a mechanical locking means, if desired. More than one region 17 can be used, if desired.

In the output zone, the maximum width of each slot is equal to a multiple of the optical fiber diameter plus one half optical fiber diameter. As used herein, the term "multiple" means a product of the optical fiber diameter by an integer, starting with the integer 1, the integer being equal to the number of optical fiber used. Thus, if the one optical fiber is used and the optical fiber has a diameter of 250 micrometer; the maximum width of the slot would be 375 micrometer. If two optical fibers are used and each optical fiber has a diameter of 250 micrometer, then maximum width of the slot (if one slot is used to accommodate both optical fibers) would be 625 micrometers. The minimum width of each slot is equal to a multiple of the optical fiber diameter. For example, if two optical fibers are used, the minimum width of the slot (if one slot is used to accommodate both optical fibers) would be 500 micrometer.

Figure 2:
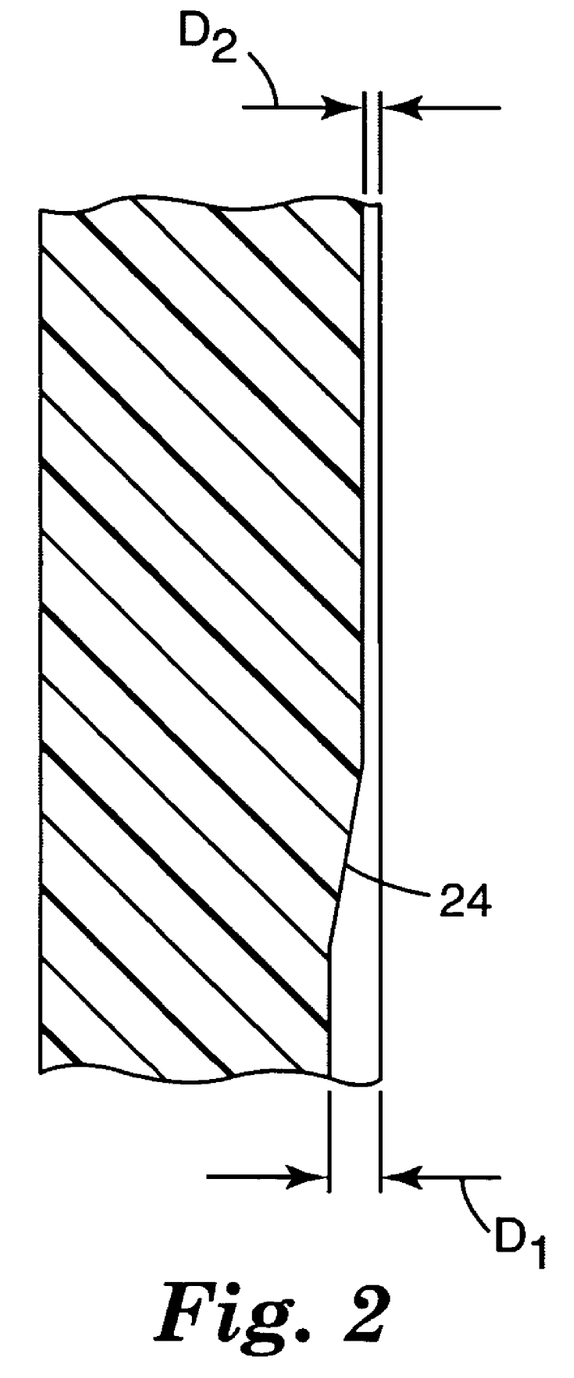
FIG. 2 is a detailed view of section 2—2 of FIG. 1.

FIG. 2 shows an exemplary embodiment where the transition zone has incline 24 starting from depth $D_1$ of the input zone and ending at depth $D_2$ of the output zone, where $D_1$ is larger in value than $D_2$. It is within the scope of the present invention to use other geometries than an incline or to use no incline at all.

In one embodiment, the input zone width, $W_1$ (as shown in FIG. 1) is substantially equal to the overall width of the total number of fiber optic cable used. The advantage of this embodiment is that it allows for a snug fit of the cables used. In another exemplary embodiment, the width of the input zone is any convenient width to hold the fiber optic cables.

Figure 3:
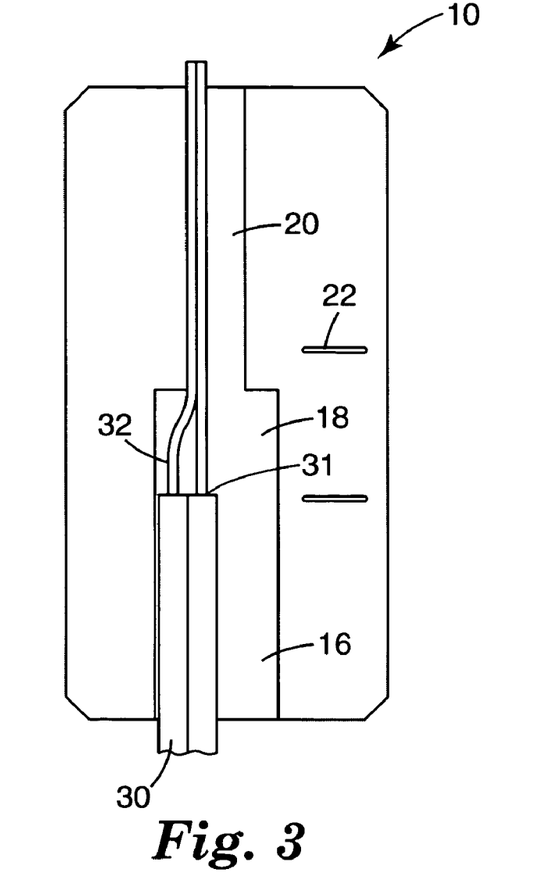
FIG. 3 is a schematic top view of an exemplary in-process ribbonized assembly.

FIG. 3 shows a portion of an exemplary in-process ribbonized assembly of the present invention. To facilitate understanding of the invention, only two fiber optic cables 30 are shown in this figure. Apparatus 10 is intended to accommodate four fiber optic cables. As an initial step (not shown in this figure), the protective jacket on the first end of the fiber optic cables 30 is stripped off so as to expose the optical fiber. The stripped cable is placed into the channel of the apparatus such that the non-stripped portion of the cable lies in input zone 16 and the exposed optical fibers lies in transition zone 18 as well as output zone 20. The exposed optical fibers can extend beyond the output zone. The stripped cable is placed so that interface 31, that is the interface between the non-stripped cable and the exposed optical fibers, lies in the transition zone between indicating means 22, if present. In the transition zone at interface 31, the exposed optical fibers start with a large gap between them and as the optical fibers reach the output zone, the optical fibers lie parallel to one another touching or nearly touching each other.

The method of making the ribbonized assembly further contains the following steps, which are not shown in FIG. 3. If desired, one can secure the fiber optic cable to the apparatus using, e.g., pressure sensitive adhesive or mechanical means. After the stripped fiber optic cable has been placed in the apparatus, an amount of ultraviolet light curable resin is dispensed to the apparatus at least in the transition zone between the indicating means, if present. Dispensing can be done, e.g., by using a syringe loaded with the resin. If excess resin is dispensed, it can be removed by any suitable means, such as a squeegee or a sharp edge of a razor blade. For example, if done, one removes the excess resin by spreading it over the exposed optical fibers, i.e., towards the output zone. After the resin has been applied, the fiber optic cables mounted on the apparatus are exposed to ultraviolet light radiation to cure the resin to yield a ribbonized assembly. After curing, the ribbonized assembly is removed from the apparatus. If desired, the ribbonized assembly can under go further ribbonization at the output zone. Any further ribbonization, however, would be for optical fibers and/or non-active fibers of the same diameter as those in the output zone.

Figure 7:
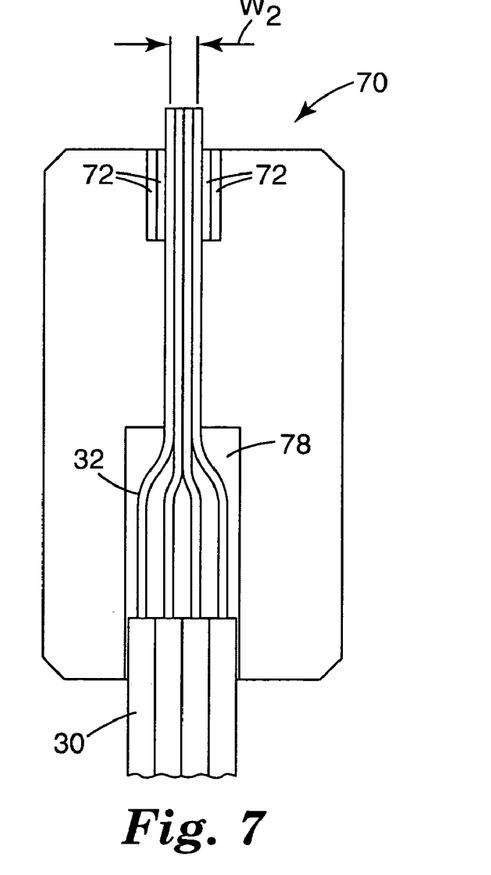
FIG. 7 is a schematic view of another exemplary in-process ribbonized assembly where the apparatus has a plurality of holding grooves in the output zone.

FIG. 7 shows another exemplary in-process ribbonized assembly. As in FIG. 3, the protective jacket of a first end of fiber optic cable 30 has been stripped to expose optical fibers 32. Four stripped fiber optic cables are placed into apparatus 70 such that the non-stripped portion of the cable lies in the input zone (not shown because it is fully occupied by the cables) and the exposed optical fibers lie in transition zone 78 and in the output zone (not shown because it is fully occupied by the optical fibers). In this particular embodiment, the output zone has at least one slot. In other words, there could be four single slots, each single slot holding each optical fiber so that the width of the single slot is one multiple of the optical fiber diameter. Alternatively, there could be two, double slots, each double holding two optical fibers so that the width double slot is two multiples of the optical fiber diameter. There could be two slots, where the first slot holding three optical fibers and the second slot holding one optical fiber. Or, there could be just one slot to hold all four optical fibers. Regardless of the number of slots used, total width of the slot, as indicated by $W_2$, is about four times (i.e., a multiple of four) the diameter of the optical fiber. Apparatus 70 further includes at least one holding groove 72 for holding non-active fibers (not shown). FIG. 7 shows four holding grooves, two on each side of optical fibers 32. The length of the holding grooves is not important, as it can extend to the transition zone, if desired. The ribbonized assembly produced would be an 8-fiber ribbon containing four optical fibers and four non-active fibers. This ribbonized assembly can be terminated to a 8-fiber ferrule. As better described in FIG. 5 (which shows a 12-fiber ferrule), each ferrule contains internal grooves lying parallel to one another. It is a common industry practice to number the grooves and call them out as fiber positions from left to right. When the 8-fiber ribbonized assembly of FIG. 7 is terminated to a 8-fiber ferrule, fiber positions 3 to 6 inclusive will function as the communication channel because they hold the optical fibers while fiber positions 1, 2, 7 and 8 hold non-active fibers. Thus, in this embodiment, the optical fibers lie between the non-active fibers.

Figure 8:
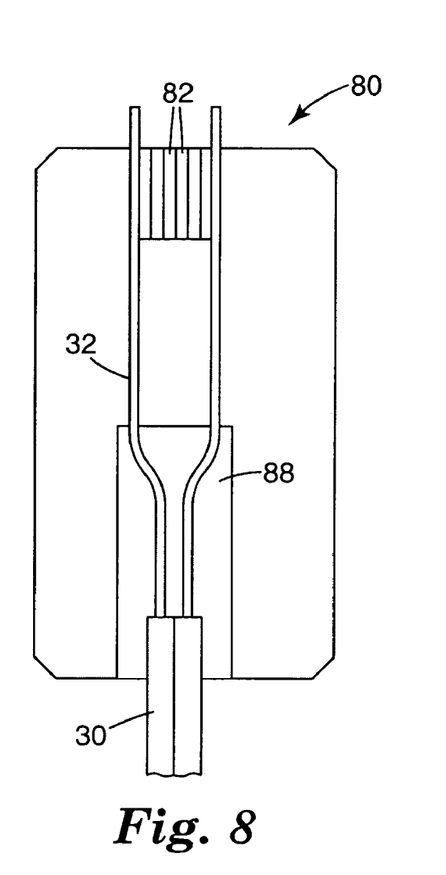
FIG. 8 is a schematic view of another exemplary in-process ribbonized assembly where the apparatus has a plurality of holding grooves in the output zone.

FIG. 8 shows yet another exemplary in-process ribbonized assembly. As in FIG. 7, the protective jacket of a first end of fiber optic cable 30 has been stripped to expose optical fibers 32. The stripped optical fibers are placed in apparatus 80 similar to that described in FIG. 7. Apparatus 80 has transition zone 88 and further includes at least one holding groove 82 in the output zone disposed between optical fibers 32. In this particular embodiment, the apparatus has two slots in the output zone, each slot having a width that is substantially equal to the optical fiber diameter, i.e., one multiple of the diameter. When the ribbonized assembly of FIG. 8 is terminated to a 8-fiber ferrule, fiber positions 1 and 8 function as the communication channel while fiber positions 2 to 7 inclusive hold non-active fibers. Thus, in this embodiment, the non-active fibers lie between the optical fibers. One skilled in the art will appreciate that any combination of positioning of the optical fibers and non-active fibers are possible in the practice of the present invention.

Figure 4:
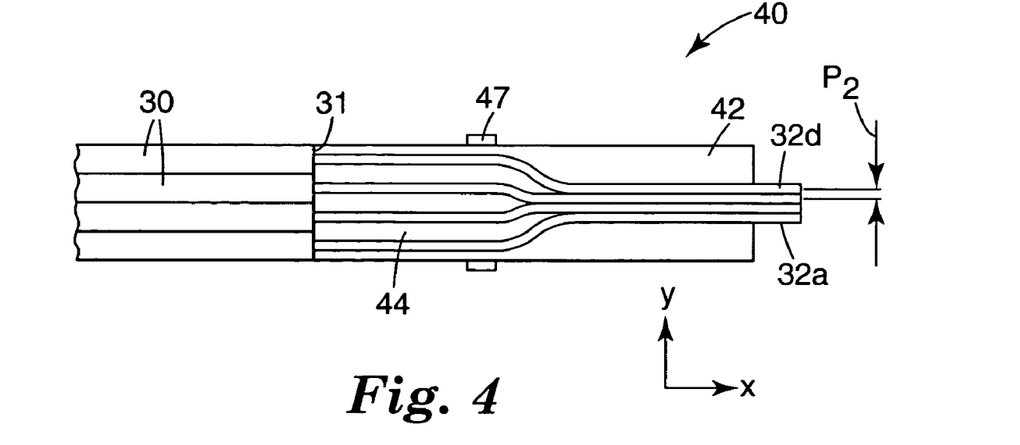
FIG. 4 is a schematic top view of an exemplary ribbonized assembly.

As shown in FIG. 4, ribbonized assembly 40 has a plurality of input fiber optic cables 30, transition region generally denoted by 44, and a plurality of optical fibers 32a to 32d lying substantially parallel to one another. In this embodiment, the transition region begins at interface 31 and continues until the optical fibers are substantially parallel to one another such that a consistent pitch, $P_2$, exists between adjacent optical fibers. In the transition region, optical fibers 32a and 32d undergo the most significant bending in the x-y plane, i.e., in the plane defined by the length and by the width of the apparatus. Some bending also occurs in the x-z plane i.e., along the thickness or the height of the apparatus. In one exemplary embodiment, the transition region is of a geometry that allows for the bending of the optical fiber without violating its minimum bend radius. The transition zone can be substantially straight or it can be curved. Block 42 schematically represents the ultraviolet light cured resin. If there is flash along the longitudinal sides (i.e., the sides that run the length of the cable) of the block, it can be removed with a sharp instrument before further processing, such as, e.g., before terminating the ribbonized assembly to a ferrule. Although FIG. 4 shows block 42 beginning at interface 31, it is within the scope of the present invention to have the block extended to the fiber optic cables. The advantage of having the UV light cured resin encasing a portion of the cable is that it will hold the cables together for subsequent processing and it allows latitude in the manufacturing process so that a precise cut off point for the resin is not needed. The exemplary embodiment of FIG. 4 further includes optional mechanical locking means 47 in the transition zone.

As stated above, the transition zone is designed with geometry to accommodate the minimum bend radius of the fiber optic cable. The geometry of the transition can be calculated using various computer software such as, e.g., computer aided design (CAD) or any geometric calculations. If using CAD, typical input variables would include, e.g., the fiber optic cable minimum bend radius, the number of cables used, and the number of optical fibers in each cable, among other variables.

Figure 5:
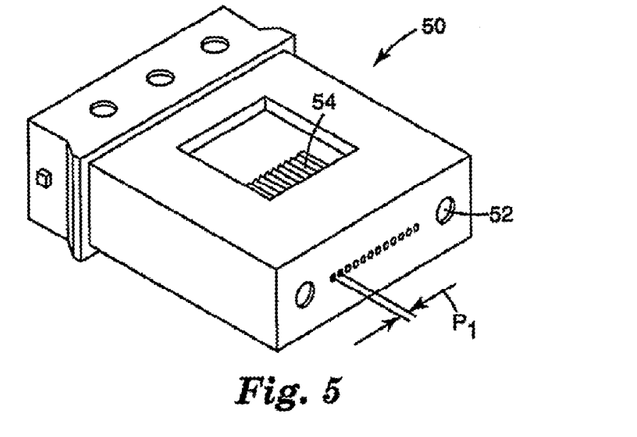
FIG. 5 is a perspective view of an exemplary a fiber optic ferrule that can be used in the present invention.

FIG. 5 shows an exemplary ferrule, in this case an industry standard MT ferrule that can be used in the present invention to terminate the ribbonized assembly of FIG. 4. In FIG. 5, ferrule 50 has a plurality of internal grooves 54 in ferrule body 56. The ferrule also has alignment holes 52 for alignment pins (not shown). The grooves have a pitch, $P_1$, which is the centerline distance between one internal groove and the next adjacent internal groove. In the present invention, the ribbonized assembly is fabricated such that the optical fiber pitch, $P_2$ (shown in FIG. 4) will substantially be equal to the internal groove pitch, $P_1$. By "substantially equal", it is meant that the position of each optical fiber will not miss the groove position in the ferrule by more than one-half the ferrule groove pitch. The ribbonized assembly can be terminated to the ferrule using any known methods currently practiced in the industry to yield a fiber optic connector (not shown). For example, it is common practice to position the ribbonized assembly so that the optical fibers protrude from the front face of the ferrule. After the ribbonized assembly has been attached to the ferrule, through for example the use of a resin such as an epoxy, the ferrule front face is polished.

Figure 6:
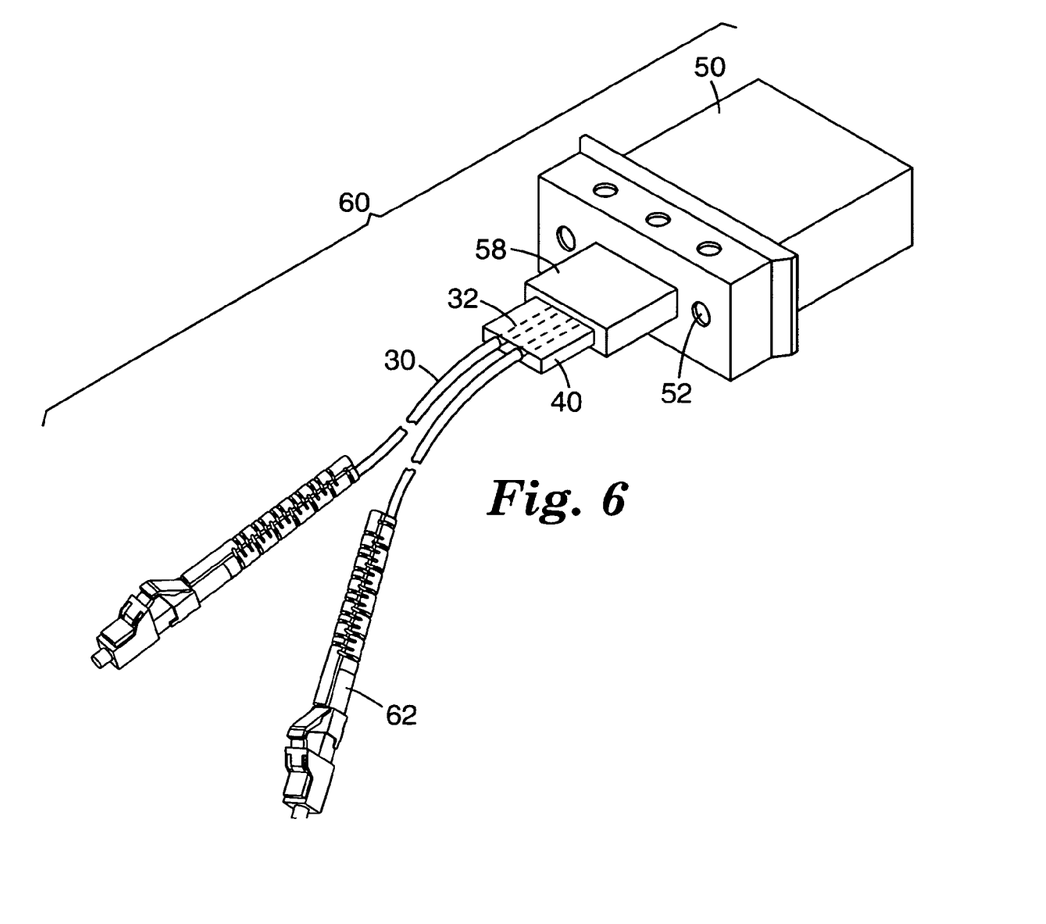
FIG. 6 is a perspective view of the ribbonized assembly of FIG. 4 attached to the connector of FIG. 5 to yield an optical interconnect device.

FIG. 6 shows an optical interconnect device 60. The device has ribbonized assembly 40 attached to ferrule boot 58 and terminated in ferrule 50. The other end of each fiber optic cable has been terminated to a single fiber connector 62, one type of optical component. Useful optical components include, but are not limited to, simplex fiber optic connector, duplex fiber optic connector, parallel fiber optic connector such as but not limited to a MT connector, simplex fusion splint, parallel fusion splint, mechanical splice splint, simplex v-groove, furcation block, shuffle block, and combinations thereof.

Although virtually any type of fiber optic cable can be used in the present invention, tight buffered fiber cable are particularly suited because they can be easily stripped and they are useful in many applications. As commonly understood in the industry, a tight buffer fiber (TBF) cable is one that has a plastic coating applied directly over the buffer. In one exemplary embodiment, a 900 micrometer TBF cable having a 250 micrometer optical fiber is used. A ruggedized fiber optic cable can also be used in the present invention. A ruggedized fiber optic cable is one that contains strength members, such as aramid fibers, typically between the buffer and the protective jacketing or as part of the protective jacketing.

The apparatus of the present invention can be made from a low adhesion polymer or a composite comprising a base overcoated with a low adhesion polymer. In one embodiment, the low adhesion polymer is tetrafluoroethylene fluorocarbon polymer. As one skilled in the art will recognize, other low adhesion polymers can be used, so long as it is chosen so as to allow for the UV curable resin to be removed from the apparatus. In one embodiment, the base is metal that is selected from materials such as aluminum, stainless steel, steel, copper, and copper alloys. Any ultraviolet light curable resin can be used in the present invention. One commercially available material is CABLELITE™ Matrix Material from DSM Desotech, Inc., Elgin, Ill.

What is claimed is:

1. An optical interconnect device comprising:
   (a) a plurality of fiber optic cables, each cable having two ends and comprising at least one optical fiber surrounded by a protective jacket where the diameter of each fiber optic cable is larger than the diameter of its optical fiber and where the protective jacket of at least a first end of the fiber optic cable have been removed thereby exposing first ends of the optical fibers;
   (b) a ribbonized assembly defining an input zone, a transition zone and an output zone encasing a port on of the first ends of the fiber optic cables and the optical fibers, where the fiber optic cables lie in a first plane and occupy the input zone, the fibers lie in a second plane substantially parallel to the first plane and occupy the output zone, the cables and fibers both occupy the transition zone in which the fibers are non-parallel, and the optical fibers in the output zone lie parallel to one another and have a first pitch; and
   (c) a ferrule terminating the ribbonized assembly, the ferrule having a plurality of internal grooves having a second pitch,
   wherein the first pitch of the optical fibers is substantially equal to the second pitch of the ferrule.

2. The device of claim 1, wherein the optical fibers in the ribbonized assembly are touching one another.

3. The device of claim 1, wherein the ribbonized assembly is of a geometry that will not violate be minimum bend radius of the optical fiber.

4. The device of claim 1 wherein at least one of the fiber optic cables is a tight buffer fiber cable or a ruggedized fiber cable.

5. The device of claim 1, wherein the ribbonized assembly comprises an ultraviolet light curable resin.

6. The device of claim 1, wherein the ribbonized assembly further comprises non-active fibers disposed adjacent to the optical fibers.

7. The device of claim 6, wherein the non-active fibers are of the same construction as the optical fibers.

8. The device of claim 7, wherein to non-active fibers are disposed between the optical fibers.

9. The device of claim 7, wherein the optical fibers are disposed between the non-active fibers.

10. The device of claim 1, wherein the protective jacket on both ends of at least one fiber optic cable has been removed to expose the optical fibers.

11. The device of claim 10 wherein the ferrule is terminated to a MT connector.

12. The device of claim 11, wherein the second end of at least one of the fiber optic cables is terminated to an optical device.

13. The device of claim 12, wherein the optical device is selected from the group consisting of simplex fiber optic connector, duplex fiber optic connector, parallel fiber optic connector, MT connector, simplex fusion splint, parallel fusion splint mechanical splice splint, simplex v-groove, furcation block, shuffle block, and combinations thereof.

14. The device of claim 1, wherein the ribbonized assembly is straight or curved.

15. An optical interconnect device comprising:
   (a) a plurality of fiber optic cables, each cable having two ends and comprising at least one optical fiber surrounded by a protective jacket where the diameter of each fiber optic cable is larger tan the diameter of its optical fiber and where the protective jacket of at least a first end of the fiber optic cable have been removed thereby exposing first ends of the optical fibers;
   (b) a ribbonized assembly encasing a portion of the first ends of the fiber optic cables and the optical fibers, where the fiber optic cables lie in a first plane and occupy an input zone, the fibers lie in a second plane substantially parallel to the first plane and occupy an output zone, the cables and fibers both occupy a transition zone in which the fibers are non-parallel, and the optical fibers in the output zone lie parallel to one another and have a first pitch, wherein non-active fibers of the same construction as the optical fibers are disposed between the optical fibers; and
   (c) a ferrule attached to the ribbonized assembly, the ferrule having a plurality of internal grooves having a second pitch,
   wherein the first pitch of the optical fibers is substantially equal to the second pitch of the ferrule.

* * * * *

UNITED STATES PATENT AND TRADEMARK OFFICE
CERTIFICATE OF CORRECTION

PATENT NO. : 7,186,031 B2
APPLICATION NO. : 10/687329
DATED : March 6, 2007
INVENTOR(S) : Lizhang Yang It is certified that error appears in the above-identified patent and that said Letters Patent is hereby corrected as shown below:

Page 2, Column 1,
References Cited, under FOREIGN PATENT DOCUMENTS,
delete "JP     0 782 022 A1     7/1997" and insert in place thereof
--EP     0 782 022 A1     7/1997 --.

Drawings,
In the drawings, please delete Sheet 4 of 5 and insert in place thereof the attached
-- Sheet 4 of 5 -- to include omitted Fig. 5.

Column 7,
Line 49, delete "be" and insert in place thereof -- the --.

Column 8,
Line 8, delete "to" and insert in place thereof -- the --;
Line 24, after the first occurrence of "splint" insert -- , --;
Line 32, delete "tan" and insert in place thereof -- than --.

Signed and Sealed this

Thirty-first Day of July, 2007

JON W. DUDAS
*Director of the United States Patent and Trademark Office*

Fig. 5

Fig. 6